UNITED STATES PATENT OFFICE.

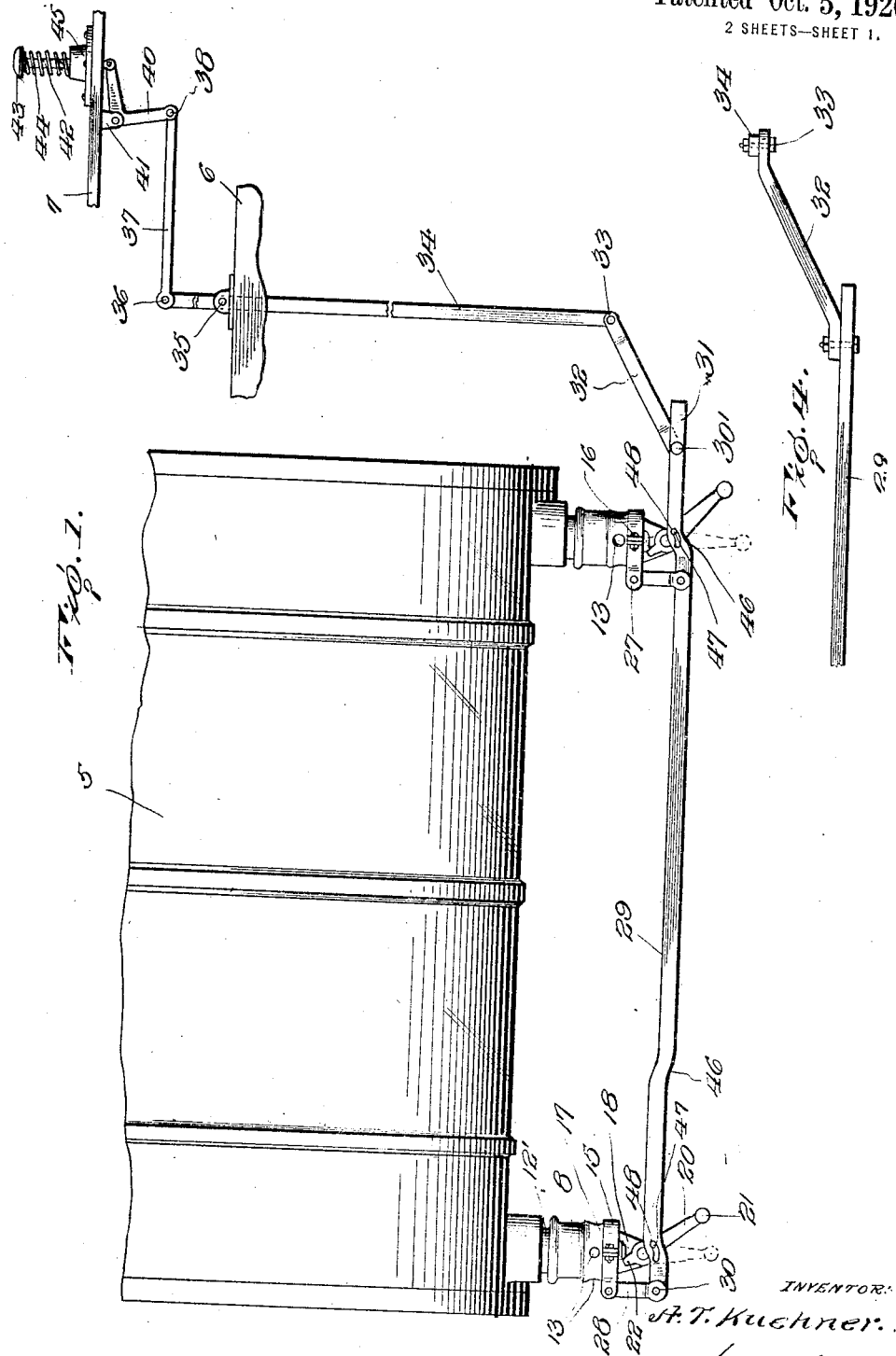

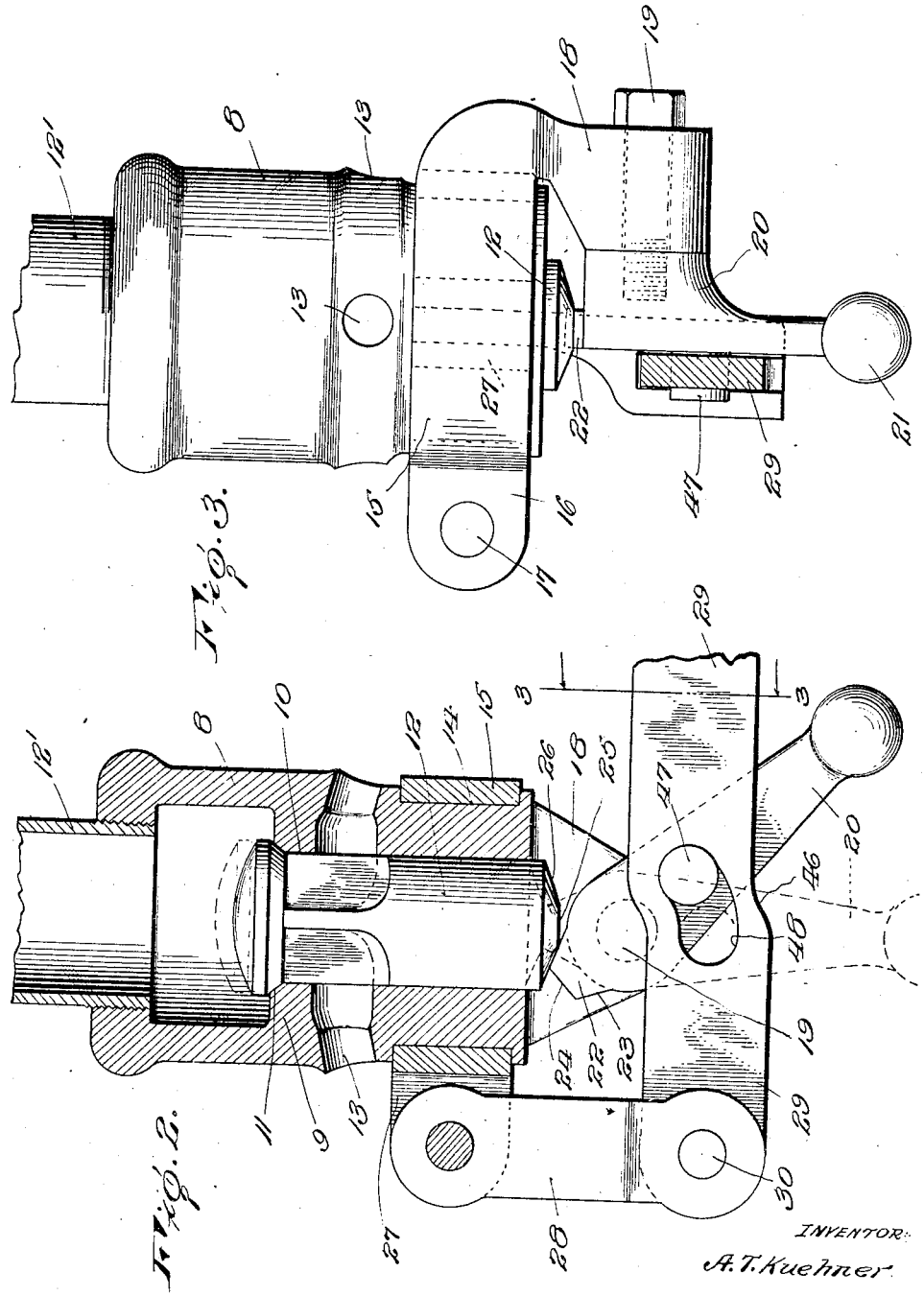

ARTHUR T. KUEHNER, OF ELKRIDGE, MARYLAND.

AUTOMATIC CYLINDER-COCK.

1,354,979.  Specification of Letters Patent.  Patented Oct. 5, 1920.

Application filed May 20, 1919. Serial No. 298,446.

*To all whom it may concern:*

Be it known that I, ARTHUR T. KUEHNER, a citizen of the United States, residing at Elkridge, in the county of Howard and State of Maryland, have invented certain new and usual Improvements in Automatic Cylinder-Cocks, of which the following is a specification.

This invention relates to cylinder drain cocks for locomotives and other engines and has for its object to provide means for automatically draining the engine cylinders and their associated units of all water of condensation, regardless of whether the engine is at work or at rest.

With the present forms of locomotive cylinder relief cocks it often occurs that the engineer through oversight or otherwise neglects to open the valve to permit drainage of the cylinder after the throttle has been closed with the result that when steam is again admitted into the cylinder the pressure of said steam on the water within the cylinder often blows out the cylinder head and frequently damages the cylinder. Furthermore, under the present method of draining engine cylinders, the valve release rod extends through alined slots in the valve and casing, respectively, thus rendering it difficult, if not impossible, to tighten the valve casing at its point of attachment to the engine cylinder and results in a leaky or defective joint which permits the constant escape of steam.

One of the principal objects of the invention, therefore, is to provide a cylinder drain cock or relief valve which will positively and automatically open each time the steam pressure is released from the cylinder and which will remain open even after the application of steam and stay open until manually closed by the engineer or other attendant in the engine cab. The advantage of a construction preventing the relief cocks being locked in the closed position when the pressure is cut off from the cylinders is obvious in that, if there is any way of locking the relief cocks in the closed position there will be times when engineers will neglect to open them with disastrous results. The invention further aims to provide a cylinder drain cock, the release rod of which is operatively connected therewith in such a manner as to permit tightening of the connection between the valve casing and cylinder without in any manner disturbing said valve casing and its associated parts.

The invention further contemplates a novel form of gravity actuated locking member or pendulum for positively holding the valve in open position until manually released by depressing an operating member in the cab of the engine.

A further object is to so construct and mount the locking member or pendulum beneath the relief valve that said pendulum will assume a position in vertical alinement with the valve immediately upon release of the steam pressure in the cylinder and in which position it will remain until manually released, when the pendulum will automatically return to normal position ready to again lock the valve open upon closing of the throttle.

A still further object of the invention is generally to improve this class of devices so as to increase their utility, durability and efficiency.

In the drawings—

Figure 1 is a side elevation of a locomotive engine cylinder provided with a drain cock or relief valve constructed in accordance with the present invention;

Fig. 2 is an enlarged vertical sectional view partly in elevation of one of the cylinder cocks, showing in full lines the relief valve in closed position and in dotted lines the position assumed by the different parts when the valve is in open position;

Fig. 3 is a vertical sectional view partly in elevation taken on the line 3—3 of Fig. 2 and looking in the direction of the arrows;

Fig. 4 is a top plan view of the release rod showing the manner of connecting the same with the upright lever on the engine frame.

Corresponding and like parts are referred to in the following description and indicated in all the views of the drawings by the same reference characters.

The improved drain cock or relief valve forming the subject-matter of the present invention is principally designed for application to the cylinders of locomotive engines and in Fig. 1 of the drawings is shown applied to such an engine in which 5 designates one of the cylinders, 6 a portion of the engine frame, and 7 the floor of the cab. It will, of course, be understood that each cylinder of the engine will be provided with two cylinder cocks or relief valves, arranged one at each end of each cylinder and as the construction and operation of the several drain cocks is identical a detailed description of one will suffice.

Each drain cock comprises a casing 8 having a transverse partition 9 formed with an opening 10, the upper wall of which is inclined or beveled to form a seat 11 for a relief valve, indicated at 12. Threaded in the upper end of the casing 8 is a coupling or nipple 12 which, in turn, is threaded in the engine cylinder 5 and through which the water of condensation from the cylinder and adjacent steam passages flows into the valve casing and thence drains out through suitable openings 13 when the relief valve 12 is in open position.

The lower end of the valve casing 8 is reduced at 14 to form an annular groove in which is seated a split collar or ring 15. The split portion of the ring 15 is provided with laterally extending ears 16 having alined perforations formed therein for the reception of a bolt or other fastening device 17 which latter serves to securely clamp said collar in position on the valve casing. The collar 15 is provided with a depending hanger 18, the lower end of which is enlarged and projects beneath the valve casing 8, as best shown in Fig. 3 of the drawings. Arranged immediately below the relief valve 12 and pivotally mounted at 19 on the enlarged end of the hanger 18 is a gravity actuated combined valve opening and locking member 20, preferably in the form of a pendulum, the lower end of which is weighted, as indicated at 21. The upper or pivoted end of the member 20 is provided with a terminal lug 22 having converging side faces 23 and a terminal flat face 24. The lower end of the relief valve 12 is also provided with a central flat face 25 and converging side faces 26 corresponding to the converging side faces 23 of the lug 22.

Extending laterally from the collar 15 and preferably arranged at right angles to the ears 16 are spaced lugs 27 between which is pivotally mounted a link 28, the lower end of the link being bifurcated to form a seat for the adjacent end of a release rod 29. The release rod 29 is pivotally connected at 30 with the link 28 and extends longitudinally of the cylinder 5 for engagement with the corresponding link of the drain cock at the rear end of the cylinder. The release rod 29 is preferably extended a short distance beyond the rear drain cock and pivotally connected at 30' to the extended end 31 of said release rod is a link 32 which is in turn pivotally connected at 33 to an upright lever 34. The lever 34 is pivotally mounted at 35 in a suitable bracket on the engine frame 6 and the link 32 is preferably offset laterally with respect to the release rod 29, as best shown in Fig. 4 of the drawings, so as to permit the upright lever 34 to be positioned close to the side of the engine frame. The upper end of the lever 34 projects a short distance beyond its pivot 35 and pivotally connected at 36 with the extended end of the lever 34 is a rod 37, the end of which is pivotally connected at 38 with the long arm of a bell crank lever, indicated at 40. The bell crank lever 40 is pivotally mounted on a bracket 41 depending from the floor 7 of the engine cab and connected with the short arm of said bell crank lever is an operating lever 42 provided with a terminal foot-piece or knob 43, there being a coiled spring 44 interposed between the foot-piece 43 and a bracket 45 secured to the cab floor for the purpose of normally and yieldably holding the release rod 29 and links 28 in the position shown in Fig. 1 of the drawings.

The release rod 29 is preferably provided with spaced offset portions 46 so as to cause said release rod to properly aline with the valve opening members 20. Projecting laterally from each combined valve opening and locking member 20 is a cylindrical pin or lug 47 which fits within an arcuate slot 48 formed in the adjacent portion of the release rod 29. The segmental slot 48 is struck from an arc having for its center the pivot pin 19 so that the member 20 is free to swing laterally on the pivot pin 19 without interference.

The weight of the lower end of the member 20 is preferably equal to or slightly greater than the combined weight of the upper end of the member 20 and relief valve 12 so that when the supply of steam to the cylinder is cut-off and pressure is released from the valve 12 the member 20 will drop by gravity from the full line position shown in Fig. 2 of the drawings to the dotted line position shown therein and in which position the relief valve will be automatically opened and thus permit drainage of water of condensation from the cylinder through the ports 13. It will here be noted that the pivotal axis of the member 20 is disposed immediately below the relief valve so that when the member 20 drops to the dotted line position shown in Fig. 2 of the drawings the member 20 will be in vertical alinement with the valve and thus lock the valve in open position and in which position it will remain until manually released by the engineer or other attendant pressing on the knob 43 of the operating lever. It will, furthermore, be noted that owing to the inclination of the side walls 23 of the lug 22 and the corresponding inclination 26 of the lower end of the relief valve, the lug 22 will ride over the lower end of the relief valve until the flat face 24 of the lug bears against the flat face 25 of the valve so that regardless of the fact whether steam is admitted to the cylinder or not the valve will remain in open position until manually released.

When the engine is running the pressure of the steam within the cylinder will hold the valve 12 to its seat. When the throttle valve is closed, however, and the pressure on the valve 12 released, the locking member 20 will move by gravity to vertical position and thus elevate the valve from its seat and permit the water of condensation in the cylinder and adjacent steam passages to be discharged through the ports 13. The valve will remain locked in open position until manually released, which is effected by the engineer pressing downwardly on the knob 43 and through the medium of the bell crank lever 41, upright lever 34 and link 32 exerting a longitudinal pull on the release rod 29 which causes the forward wall of the slot 48 to press against the adjacent pin 47 and tilt the member 20 out of direct alinement with the valve 12 when the steam pressure within the cylinder will automatically seat the valve, the locking member 20 returning to normal position and in which position it will automatically reopen the valve as soon as the steam pressure in the cylinder is reduced or entirely cut-off. Only a slight downward movement on the operating lever 42 is necessary in order to effect the release of the locking member 20 as the pressure of the steam on the upper end of the relief valve will cause said valve to seat as soon as the square face 24 on the lug 22 clears the flat face on the lower end of the valve. It will thus be seen that it is absolutely necessary for the engineer to manually release the valve-opening means to close the cylinder cock after the engineer is sure that the cylinder and steam passages have been drained of all water of condensation, this operation being repeated each time the throttle is opened. Should the engineer attempt to start the engine before pressing the knob 43 the steam would escape through the ports 13 and thus remind him of the fact that he had failed to release the valve opening means. Inasmuch as the valve-opening means is automatic in action it is impossible to cause damage to the cylinder by failure of the engineer to open said valve and permit drainage of the water of condensation prior to starting the engine.

While it is preferred to arrange the lever 34 and link 32 at the rear of the cylinder it will, of course, be understood that said parts may be connected with the release rod 29 at the front end of the cylinder if desired and in which event the connecting rod 37 will be made corespondingly longer so as to pivotally connect it with the upper end of the lever 34. In either event, however, the construction and operation of the device is the same and inasmuch as the cylinder cocks are connected by the release rod 29, the relief valves will operate in unison at all times. The device is extremely simple in construction and will effectually perform the functions for which it is designed under all conditions of service.

Having thus described the invention, what is claimed as new is:

1. In an engine, the combination with a steam cylinder, of a drain cock including a relief valve, a valve opening member pivotally mounted beneath the relief valve and movable by gravity to elevate the valve from its seat and locking the same in elevated position, and means for moving the valve-opening member to inoperative position to permit seating of the valve.

2. In an engine, the combination with a steam cylinder, of a drain cock including a relief valve, a combined valve opening and locking member arranged beneath the relief valve and movable by gravity to open the valve, an operating lever, and a release rod operatively connected with said operating lever and the combined valve opening and locking member for actuating said member to permit closing movement of the relief valve.

3. In an engine, the combination with a steam cylinder, of a drain cock including a relief valve, a combined valve opening and locking member pivotally mounted beneath the relief valve and movable by gravity to open the valve, and a release rod operatively connected with said member for tripping the same to permit closing movement of the valve, said member being free to swing independently of the release rod.

4. In an engine, the combination with a steam cylinder, of a drain cock including a relief valve having a central flat face and a beveled edge, a combined valve opening and locking member pivotally mounted beneath the valve and provided at its pivoted end with a lug having a flat face and converging side faces, said member being movable by gravity to a position in vertical alinement with the valve and with the flat face of the lug bearing against the flat face of the valve for holding the valve in open position, and means operatively connected with said member for tripping the same to permit closing movement of the valve.

5. In an engine, the combination with a steam cylinder, of a drain cock including a casing and relief valve, a collar, secured to the casing, a hanger depending from the collar, a combined valve opening and locking member pivotally mounted for swinging movement on the hanger and provided with a laterally extending pin, a release rod having a segmental slot receiving said pin, a link forming a connection between the release rod and collar, an inclined link secured to one end of the release rod and offset with respect thereto, an upright lever pivotally connected with the inclined links, a rod connected with the upper end of the upright lever, a bell crank lever pivotally connected with the rod, an operating member connected with the bell crank lever, and a spring encircling the operating lever.

6. In combination with an engine cylinder, a relief cock including gravity actuated means positively locking the same in the open position when the steam pressure is cut off, and cock closing means preventing the cock being locked in the closed position when the pressure is cut off.

7. In combination with an engine cylinder, a relief cock including gravity actuated means positively locking the same in the open position when the steam pressure is cut off, and means movable in one direction for releasing the gravity means for closing the cock by steam pressure and including a spring returning said means to its normal position to prevent the cock being locked in the closed position when the pressure is cut off.

8. In combination with an engine cylinder, a relief cock including gravity actuated means positively locking the same in the open position when the steam pressure is cut off, cock closing means preventing the cock being locked in the closed position when the pressure is cut off, and an operating member having means connecting the same with said cock closing means and including a spring returning said operating member to the normal position.

9. In combination with an engine cylinder having a relief cock mounting carrying a vertically rising and falling relief valve, a gravity moved member carried by said mounting for actuating said valve and positively locking the same open at all times while the steam pressure is cut off from the cylinder, and means preventing the cock being locked closed when the pressure is cut off.

In testimony whereof I affix my signature.

ARTHUR T. KUEHNER.